(12) United States Patent
    Edwards

(10) Patent No.: US 10,175,751 B2
(45) Date of Patent: Jan. 8, 2019

(54) METHOD AND APPARATUS FOR DYNAMIC SENSOR CONFIGURATION

(71) Applicant: Change Healthcare Holdings, LLC, Nashville, TN (US)

(72) Inventor: Cliff Edwards, Delta (CA)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 801 days.

(21) Appl. No.: 13/719,829

(22) Filed: Dec. 19, 2012

(65) Prior Publication Data
    US 2014/0172373 A1    Jun. 19, 2014

(51) Int. Cl.
    *G06F 3/01*    (2006.01)
    *G06K 9/00*    (2006.01)

(52) U.S. Cl.
    CPC .............. *G06F 3/011* (2013.01); *G06F 3/017* (2013.01); *G06K 9/00973* (2013.01)

(58) Field of Classification Search
    CPC ..... G06F 3/011; G06F 3/017; G06K 9/00771; G06T 7/2093; G08B 13/19645; H04N 5/247
    See application file for complete search history.

(56) References Cited

U.S. PATENT DOCUMENTS

| | | | | |
|---|---|---|---|---|
| 6,359,647 | B1 * | 3/2002 | Sengupta et al. | 348/154 |
| 2008/0055412 | A1 * | 3/2008 | Tanaka | G08G 1/04 348/159 |
| 2009/0322891 | A1 * | 12/2009 | Kondo | G06T 3/4038 348/218.1 |
| 2010/0157064 | A1 * | 6/2010 | Cheng | G06K 9/00771 348/169 |
| 2010/0281440 | A1 * | 11/2010 | Underkoffler et al. | 715/863 |
| 2013/0328763 | A1 * | 12/2013 | Latta et al. | 345/156 |
| 2014/0104394 | A1 * | 4/2014 | Yanai | H04N 13/0253 348/47 |

* cited by examiner

*Primary Examiner* — Kyle R Quigley
(74) *Attorney, Agent, or Firm* — Alston & Bird LLP

(57) ABSTRACT

A method, apparatus and computer program product are therefore provided to interpret sensor input. In this regard, the method, apparatus and computer program may receive input from a plurality of sensors (e.g., different user input devices), and configure a sensor interpreter based on sensor criteria received from the plurality of sensors. The input received from the sensors may include a distance between a user location and one or more sensors, and a sensor interpreter may be configured based on the distance of the location from of the sensors. The sensor interpreter may be configured so that input operations are transparent to the user, without requiring the user to consciously change the way they interact with the sensors as the sensor interpreter is configured.

20 Claims, 4 Drawing Sheets

METHOD AND APPARATUS FOR DYNAMIC SENSOR CONFIGURATION

TECHNOLOGICAL FIELD

An example embodiment of the present invention relates generally to receiving input from sensors, and, more particularly, to interpreting input from a plurality of sensors.

BACKGROUND

As technological advances have led to increased power and sophistication of computing devices, advances have also led to new methods of interacting with these devices. In addition to traditional input methods such as keyboards and mice, users may also interact via voice communications, gestures, or using touch screens. Such alternative input techniques and devices allow for new methods of interaction for various use cases. For example, a surgeon performing a procedure may be able to interact with a computer system via voice commands or gesture tracking, allowing the surgeon to provide input to the computer without touching the device itself, which would require the surgeon to reestablish a sterile environment before interacting with the patient.

Due to the different sensitivities and interaction methods provided by different input devices, interacting with a single computer equipped with multiple input devices may prove difficult. Implementations may include multiple gesture tracking systems of different precisions, such that the user may accidentally simultaneously interact with multiple inputs at the same time. For example, a first gesture tracker may have an effective range from 6 meters away from a sensor up to 0.8 meters from a sensor, and a second, more precise but shorter range, gesture tracker might have an effective range up to one meter away from the sensor. As such, if the user was present within the overlapping range from 0.8 meters to 1 meter from the sensors, gestures might produce unpredictable behavior due to the overlapping sensor ranges. Furthermore, if the same system is also equipped with a touch screen, input made on the touch screen might be picked up by the second gesture sensor. The user is also confronted with the problem that different sensors are designed for different types of input, such that the input required from a user in the effective range of the first sensor might not be registered properly by the second sensor, or the second sensor might provide for a much greater range of input operations that the first sensor.

When interacting with a plurality of sensors, users also typically must direct or manage which sensor or combination of sensors is active in interpreting the input. Different sensors often require separate and distinct input modalities (e.g., a gesture for a gesture tracker versus a mouse click for a mouse versus pressure applied to a touch screen for a touch screen), such that the user must consciously conform their input to the modality of the desired sensor. The active nature of these changes in input modality may be distracting and unintuitive, interfering with the user's operation of the system.

BRIEF SUMMARY

A method, apparatus and computer program product are therefore provided according to an example embodiment of the present invention in order to provide an efficient interface for interpreting sensor input. In this regard, the method, apparatus and computer program product of an example embodiment may receive input from a plurality of sensors (e.g., different user input devices), and configure a sensor interpreter based on input received from the plurality of sensors. The input received from the sensors may include a location of a user, and a sensor interpreter may be configured based on the distance of the location from one or more of the sensors. For example, the set of information may include effective ranges of one or more of the plurality of sensors and/or appropriate user inputs for one or more of the plurality of sensors. The sensor interpreter may be configured to adjust sensor modalities so that input operations are transparent to the user, without requiring the user to consciously change the way they interact with the sensors as the modalities change. In this manner, example embodiments provide for smooth, intuitive transitions between sensors that cover ranges of distances, which support the user in natural, intuitive computer control in a variety of control use cases.

Embodiments may include a method. The method may include receiving input from at least one of a plurality of sensors, receiving at least one sensor criteria from one or more of the plurality of sensors, determining, using a processor, a configuration of a sensor interpreter based on the received sensor criteria, interpreting the received input based on the configuration of the sensor interpreter, and processing the interpreted received input to instruct an application. Interpreting the received input may include disregarding input from at least one of the plurality of sensors. In some embodiments, interpreting the received input includes blending input from at least two of the plurality of sensors. Blending input may include weighting the input based on the signal to noise ratio of the sensor from which the input was received. In some additional embodiments, blending input may include weighting the input based on the distance of the user compared to the effective range of the sensor from which the input was received. The method may also include receiving a set of sensor parameters for at least one of the plurality of sensors and generating at least one rule for configuring the sensor interpreter based on the set of sensor parameters. The at least one rule may define the configuration of the sensor interpreter based on the sensor criteria. The set of sensor parameters may include at least one of a maximum effective range of the at least one of the plurality of sensors, a minimum range of the at least one of the plurality of sensors, and a signal to noise ratio at a particular distance of the at least one of the plurality of sensors. The sensor criteria may include at least one of a user's location, a distance between a user and at least one of the plurality of sensors, an ambient light level, an indicator of a user's status, a background noise level, apparel worn by the user, or the presence of a tracking marker. In some embodiments, the sensor interpreter may be configured based on the distance between the user and the sensor. A first sensor interpreter may be associated with a first range of distances between the user and the sensor, and a second sensor interpreter may be associated with a second range of distances between the user and the sensor. The first range of distances and the second range of distances may overlap, providing hysteresis for a switch between the first sensor interpreter and the second sensor interpreter. The sensor criteria may be derived from the received input.

Embodiments may provide an apparatus comprising processing circuitry. The processing circuitry may be configured to receive input from at least one of a plurality of sensors, receive at least one sensor criteria from one or more of the plurality of sensors, determine a configuration of a sensor interpreter based on the received sensor criteria, interpret the received input based on the configuration of the sensor interpreter, process the interpreted received input to instruct an application. Interpreting the received input may include disregarding input from at least one of the plurality of sensors. In some embodiments, interpreting the received input includes blending input from at least two of the plurality of sensors. Blending input may include weighting the input based on the signal to noise ratio of the sensor from which the input was received. Blending input may additionally or alternatively include weighting the input based on the distance of the user compared to the effective range of the sensor from which the input was received. In some embodiments, the processing circuitry is further configured to receive a set of sensor parameters for at least one of the plurality of sensors, and generate at least one rule for configuring the sensor interpreter based on the set of sensor parameters. The at least one rule may define the configuration of the sensor interpreter based on the sensor criteria. The set of sensor parameters may include at least one of a maximum effective range of the at least one of the plurality of sensors, a minimum range of the at least one of the plurality of sensors, and a signal to noise ratio at a particular distance of the at least one of the plurality of sensors.

Embodiments may further provide a computer program product. The computer program product may include at least one non-transitory computer-readable storage medium bearing computer program instructions embodied therein for use with a computer. The computer program instructions may include program instructions configured to receive input from at least one of a plurality of sensors, receive at least one sensor criteria from one or more of the plurality of sensors, determine a configuration of a sensor interpreter based on the received sensor criteria, interpret the received input based on the configuration of the sensor interpreter, and process the interpreted received input to instruct an application.

BRIEF DESCRIPTION OF THE DRAWINGS

Figure 1:
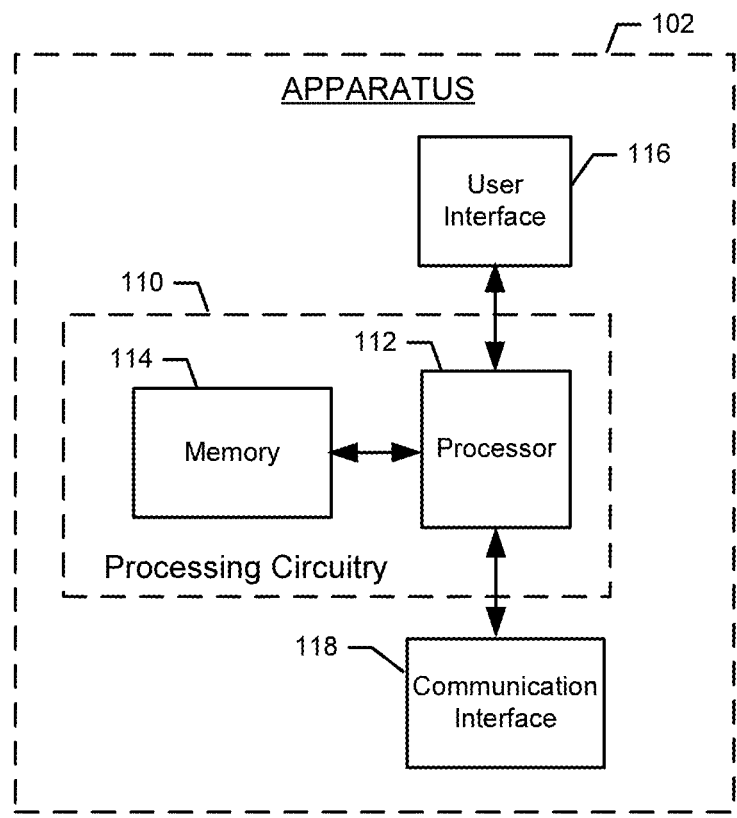
Figure 2:
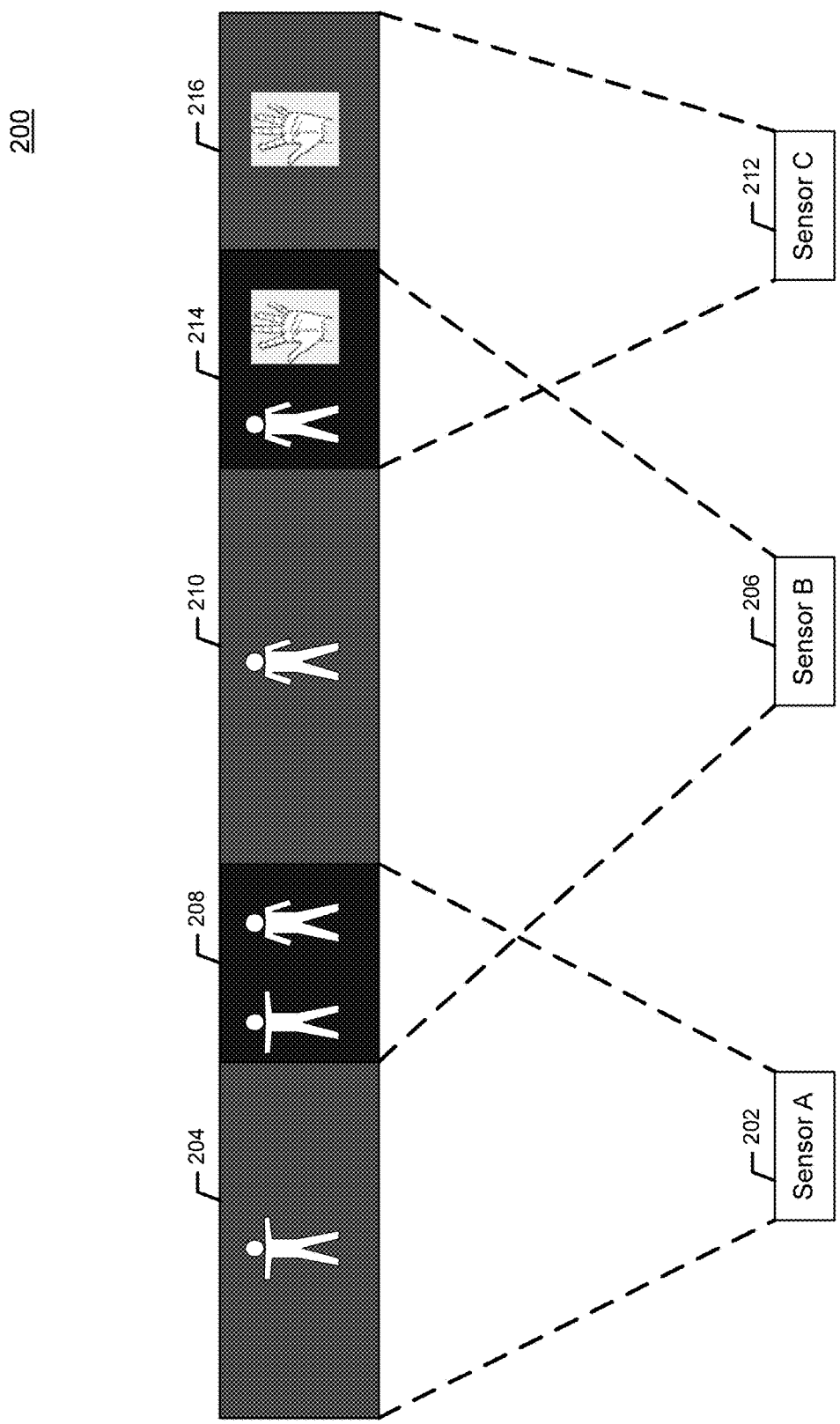
Figure 3:
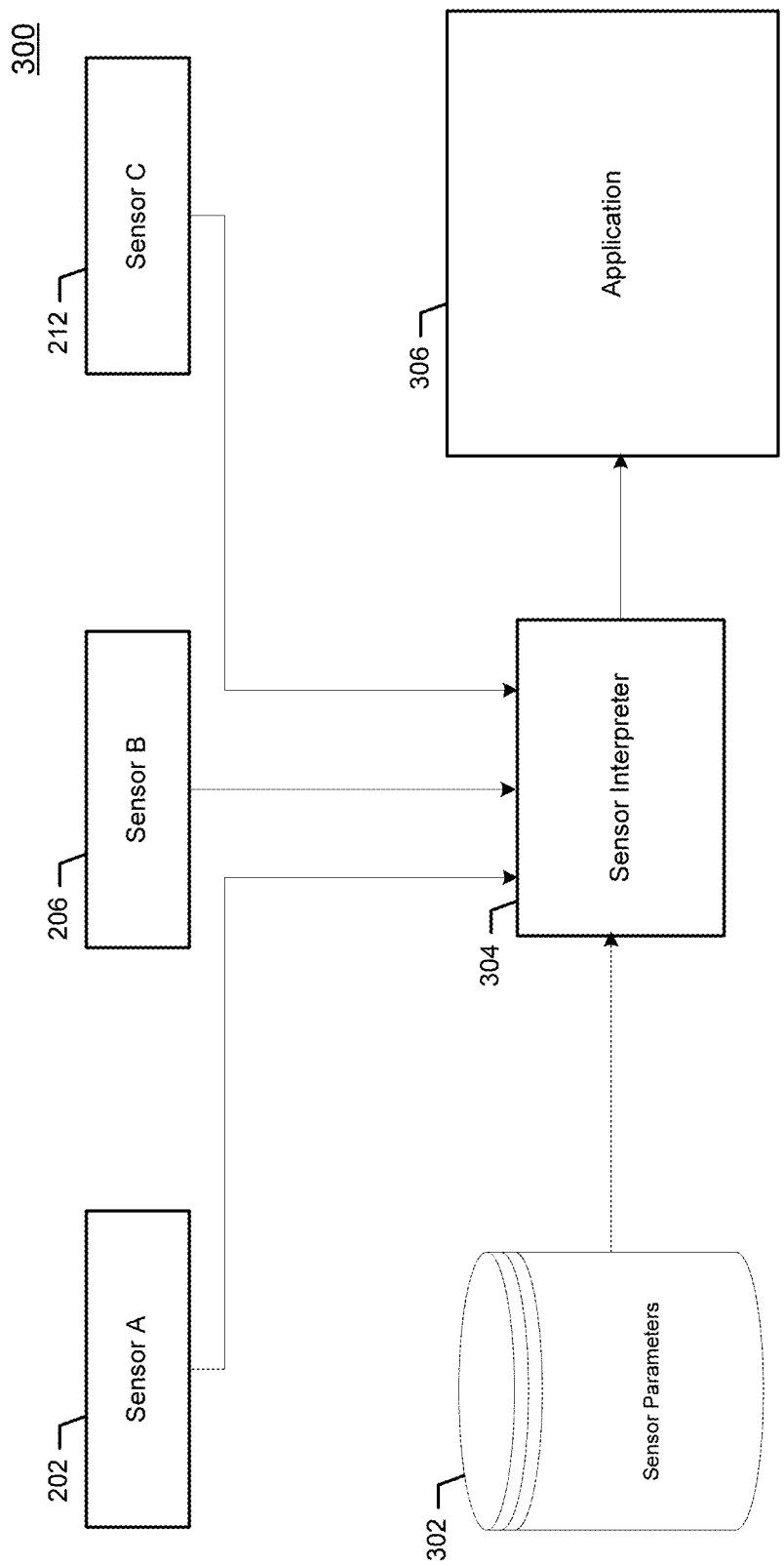
Figure 4:
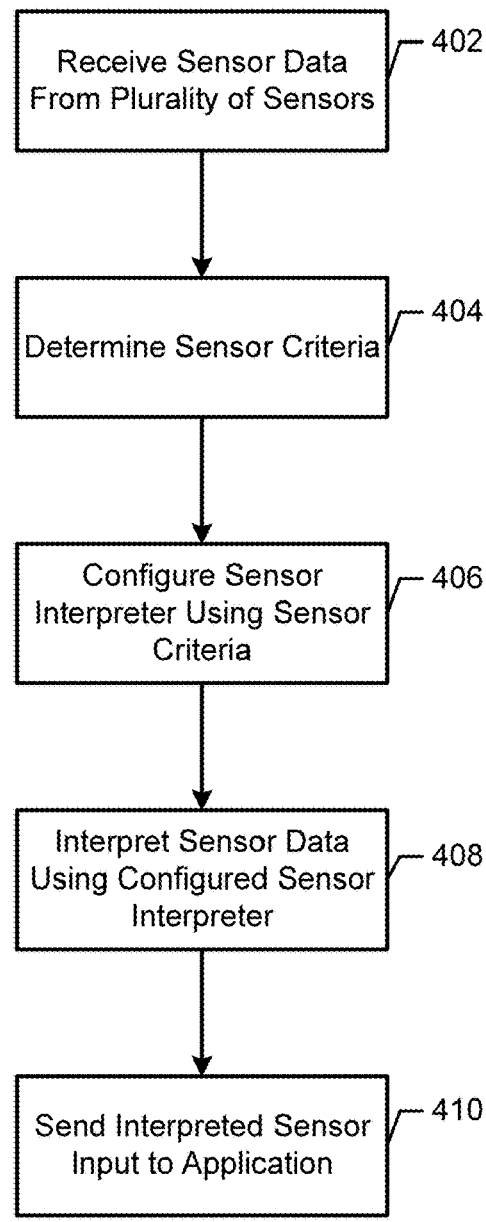

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a block diagram of a plurality of sensors receiving input from a user in accordance with an example embodiment of the present invention;

FIG. 3 is a block diagram depicting data flow among a plurality of sensors, a sensor interpreter, and an application in accordance with an example embodiment of the present invention; and FIG. 4 is a flow diagram depicting an example method for interpreting sensor input in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided in accordance with an example embodiment of the present invention in order to interpret sensor input. In this regard, a method, apparatus and computer program product of an example embodiment may receive input from a plurality of sensors and configure a sensor interpreter based on the received input. The received input may be processed by the configured sensor interpreter to provide input to an application.

The term "sensor interpreter" is used to relate to a construct, including hardware and/or software, which manages mapping sensor inputs to control outputs. As the relationship between the user and the sensors changes, the sensor interpreter may interpret the sensor data in different ways according to the relationship. The sensor interpreter may control which sensor inputs are used to provide outputs in response to receiving data from multiple sensors based on the location of the user (e.g., the distance between the user's location and the location of one or more of the sensors). For example, a sensor interpreter may be configured to enable or disable particular sensors as a user moves in and out of the effective range of these sensors. Additionally or alternatively, the sensor interpreter may blend input from a plurality of sensors using a filtering algorithm to arrive at outputs. For example, as the user approaches a particular sensor, input received from that sensor may be weighted more heavily to determine output than input received from a sensor from which the user is moving away. Although the term sensor interpreter is generally described as being configured or reconfigured to alter sensor input, embodiments of the invention may also employ multiple sensor interpreters, such that sensor interpreters are switched as appropriate to alter interpretation of sensor data.

FIG. 1 illustrates a block diagram of an apparatus 102 in accordance with some example embodiments. The apparatus 102 may be any computing device configured to interpret input from one or more sensors. Output may be determined according to a sensor interpreter configuration based on input received from the one or more sensors. For example, the sensor interpreter may reference a series of rules, filters, and algorithms for determining output when input is received from a plurality of sensors. These rules, filters, algorithms, and the like may alter the interpretation of sensor input based on a set of sensor criteria. For example, the sensor criteria may define a particular range at which certain sensors should be enabled, or a particular distance or range of distances at which sensor input should be blended. The sensor criteria may be derived from sensor data received from the sensors, such as by using a gesture tracker sensor to determine a distance between a user location and the gesture tracker sensor. The apparatus 102 may be further configured to execute the application. For example, in some particular embodiments, the apparatus 102 may be configured to perform or otherwise assist with medical diagnostic and/or imaging operations. As a specific example, the apparatus 102 may be implemented on or as a computing device that may be configured to access and display images stored in a Digital Imaging and Communications in Medicine (DICOM) format. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 18 via a bus or buses for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the apparatus 102 is implemented on a server, aspects of the user interface 116 may be limited, or the user interface 116 may even be eliminated. For example, the apparatus 102 may provide for interpretation of sensor input received on a remote computer or client device, such that sensor data is supplied via a user interface of the client device, even though the apparatus 102 itself lacks said user interface 116.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

FIG. 2 is a block diagram of a system 200 including a plurality of sensors receiving input from a user in accordance with an example embodiment of the present invention. The system 200 depicts three sensors, sensor A 202, sensor B 206, and sensor C 212. Although three sensors are depicted with respect to the system 200, it should be appreciated that as few as two sensors or any number of sensors with any effective ranges could be used to implement embodiments of the invention. Each of the sensors has a particular effective range, depicted as the overlapping gray rectangles 204, 210, and 216. The first rectangle 204 depicts the effective range of sensor A 202, the second rectangle 210 depicts the effective range of sensor B 206, and the third rectangle 216 depicts the effective range of sensor C 212. Although FIG. 2 depicts the sensors as at different locations and with effective ranges perpendicular to the sensor locations, the system could also be implemented as a series of sensors at a single location, with different overlapping effective ranges directed across a line or in various arcs out from the central sensor location.

Each of the sensors A, B, and C may represent a different type of input sensor with a different effective range. For example, sensor A 202 may be a gesture tracking device with an effective range of 6 meters to 0.8 meters, such as the Kinect® sensor manufactured by Microsoft®. Sensor B 206 may be a more sensitive gesture tracking device with a shorter effective range (e.g., within 1 meter of the sensor), such as the "Leap" sensor manufactured by Leap Motion®. Sensor C 212 may be a touch sensitive sensor, such as a touch screen or other extremely short range (e.g., 10 centimeters or less) sensor. For example, sensor C 212 may be a projected capacitive proximity sensor enabled by the Microchip® MGC3130 electrical near field (E-field) 3D Tracking and Gesture Controller.

The sensors may have overlapping effective ranges, as depicted by the overlapping zones of the first and second rectangles and the second and third rectangles, respectively. These overlapping effective ranges 208, 214, depict areas for which input performed by a user could be recognized by two or more sensors. The rectangles are associated with icons indicating input methods that the sensors that cover each effective range are configured to accept. For example, the overlapping effective range 208 is configured to accept both "coarse" gestures (e.g., large gestures such as the user sweeping their arm across their entire body) via sensor A 202, and "fine" gestures (e.g., a 30 centimeter hand wave gesture) via sensor B 206. The overlapping effective range 214 is configured to accept both fine gestures via sensor B 206 and touch screen or other short/zero range input via sensor C 212.

The overlapping effective ranges 208, 214 may also relate to areas in which the sensor interpreter is configured to transition from one gesture type to another. For example, in the overlapping effective range 208, since the effective range 208 includes an area where both "coarse" and "fine" gestures may be accurately interpreted by their respective sensors, the sensor interpreter may be configured to blend input from the sensors, enabling the user to perform input via subtler gestures as the distance decreases to the sensor B 206. A dynamic weight may be applied to a blending algorithm based on the distance to the sensor B 206, such that input received from sensor B 206 is afforded a larger weight as the distance to the sensor B 206 decreases, and a smaller weight as the distance to the sensor B 206 increases. In this manner, the overlapping effective ranges 208, 214 may provide transition zones that provide the user with a consistent experience as their relationship to the sensors changes, without dramatic changes in required user input as the user enters the effective range of one sensor and leaves another.

As such, as the user moves throughout the effective ranges, different input operations become available by virtue of entering the effective area of the different sensors. Embodiments of the invention may reconfigure a sensor interpreter to accept and process input as the relationship (e.g., the user location relative to the sensors) between the user and the sensors changes. For example, a computer system may simultaneously receive input from two or more of the sensors when the user is within an overlapping effective range 208 or 214. The sensor interpreter may determine which of the two or more sensors is used to control output, or how input from both sensors may be effectively blended based on the distance to the user's location. Embodiments may derive sensor criteria from data received from the sensors, and use the sensor criteria to configure the sensor interpreter (e.g., the first sensor indicates the user's location is 1 meter away, and at 1 meter of distance the sensor interpreter should be configured to disable the second sensor, therefore the sensor interpreter will be configured to disable input from the second sensor). Embodiments of the invention may include a framework for deciding from which sensor or sensors to accept input, and various methods for processing that input to control an application.

FIG. 3 is a block diagram depicting data flow 300 among a plurality of sensors, a sensor interpreter, and an application in accordance with an example embodiment of the present invention. The data flow 300 may depict, for example, data flow from one or more sensors into an apparatus such as the apparatus 102 depicted with respect to FIG. 1. Sensor input may flow from each of the sensors, sensor A 202, sensor B 206, and sensor C 212, to a sensor interpreter 304. The sensor interpreter 304 receives the input from the sensors and determines output to be sent to the application 306. The sensor interpreter 304 may be implemented as hardware, software, or a combination of the two. For example, the sensor interpreter 304 may function as an intermediate software layer to which user input is routed for processing, as a bridge device physically coupled to one or more of the sensors, or any other implementation by which sensor data may be received and processed prior to execution by an application. For example, the sensor interpreter 304 may receive sensor input via an application programming interface (API) with which the sensors are configured to operate. Such an API may also provide data about the sensors, such as the sensor parameters (see below). In some embodiments, the sensor interpreter 304 may be implemented as a part of the application 306, such that input is routed through the sensor interpreter 304, and the sensor interpreter 304 instructs other components of the application 306.

The sensor interpreter 304 may be configurable based on sensor criteria derived from sensor data. The sensor interpreter 304 as employed by the system may control how particular input operations (e.g., gestures, postures, display pressure readings, etc.) are translated to application commands. The sensor interpreter 304 may further control from which sensors input is accepted. For example, as the user passes out of the effective range of a first sensor and into the effective range of a second sensor, the sensor interpreter 304 may be reconfigured to disregard input received from the first sensor, to execute input received from the second sensor, and to enable processing of inputs that are specific to the second sensor.

The sensor criteria may be derived from input from a particular sensor. In some embodiments, sensors may independently derive sensor criteria and provide such sensor criteria to the sensor interpreter. For example, a particular sensor might determine an accurate user location, and provide the location to the sensor interpreter. Additionally or alternatively, sensor criteria may be determined by the sensor interpreter from the sensor input data itself. For example, two individual sensors may not provide an accurate measurement of a user location, but using the two sets of data in concert may provide for the accurate measurement. In some embodiments, sensor criteria may be provided to the sensor interpreter 304 in a particular format or data type. For example, a sensor may indicate to the sensor interpreter 304 that certain data is to be used for configuration of the sensor interpreter 304 by sending such data as a particular message type or according to a particular application programming interface. As the sensor criteria derived from the sensor data changes (e.g., as the user location changes relative to the sensor, or as the user begins providing input via a different sensor), the sensor interpreter 304 may be dynamically reconfigured based on the criteria.

The sensor interpreter 304 may provide for handling of handoff from one sensor to another as input is received in different overlapping sensor effective ranges. For example, the sensor interpreter 304 may determine which of two or more sensors should provide input to the application 306 when valid input is received from the two or more sensors. Whether or which input is valid may be determined based on one or more factors, such as the distance of the user from the sensor(s), the type of input performed by the user, adjustments in room lighting conditions, indications of a change in a user status (e.g., a physician may indicate to the system that he has "scrubbed in" for a medical procedure and thus will be unable to provide touch input) or any other factor which might cause variability in the effectiveness of different sensors. In some embodiments, an absolute distance may be used to determine which input to select (e.g., within 5 meters use sensor B, further than 5 meters use sensor A), or a distance range may be used along with hysteresis techniques (e.g., switch to sensor B when the user comes closer than 4 meters, switch to sensor A when the user travels further than 5 meters) to avoid rapid reconfiguration of the sensor interpreter. In some embodiments, sensor input may be blended together according to various blending techniques when the user is within an effective range of two or more sensors. For example, input from each sensor may be weighted based on the effective range of the sensor, or input may be weighted based on the signal-to-noise ratio of input received from the sensor at the particular range. As such, the sensor interpreter 304 may provide for algorithms, methods, and processes for handling the handoff from one sensor or sensors to another as the user varies their relationship to the sensors (e.g., changes their distance to the sensors) in order to provide a seamless user experience.

The sensor interpreter 304 may also receive sensor parameters 302. The sensor parameters 302 may include data about one or more sensors coupled to the system. The sensor parameters 302 may be populated with data describing effective ranges and valid input operations of the sensors during installation or configuration of the sensors. These sensor parameters 302 may be received from sensors directly (e.g., by an API), from a configuration file residing locally or remotely to the sensor interpreter 304, from driver software associated with the sensors, or from any other source capable of providing information about the sensors coupled to the sensor interpreter 304. The sensor parameters 302 may be defined at run-time (e.g., from messages received from the sensors) or prior to run-time (e.g., as values read from a configuration file). For example, device drivers for the sensors may be configured to provide information about the sensors to the sensor interpreter on demand, the sensor hardware may be responsive to queries for such information, or the sensor parameters 302 may be read from a configuration file. The sensor parameters 302 may include, for example, the maximum effective range of the sensor, the minimum effective range of the sensor, data structure definitions for sending data to or receiving data from the sensor, pressure values for touch-sensitive sensors, signal-to-noise ratios for the sensor at particular ranges, or any other data relevant to receiving and/or processing data from the sensor.

As an example, a set of sensor parameters might be provided in a data structure as follows:

```
struct_sensor_parameters {
    Effective_minimum_distance
    Effective_maximum_distance
    Noise_threshold
    Signal_to_noise_ratio
    Input_to_output_divisor }
```

The values of the sensor parameters may include the parameters for the specific sensor associated with the data structure. For example, the effective_minimum_distance may define the minimum distance at which the sensor can effectively receive input. The effective_maximum_distance may define the maximum distance at which the sensor can effectively receive input. The noise_threshold may define the maximum threshold at which information from the sensor is received reliable for a given set of samples, such as, for example, 50 ms. In some embodiments, this may be implemented as a Look Up Table describing a curve given different sensing distances, rather than a single value. The signal_to_noise_ratio may define the signal to noise ratio as derived from a moving window of sensor samples (e.g., 50 ms). The input_to_output_divisor may define a configurable ratio of input units to output units. For example, when mapping gesture input to control output for an imprecise gesture sensor input changes may be divided by a value of 5, but for a more precise gesture sensor input may be divided by a value of only 2, or even 1. Each sensor parameter structure may also include configuration values for mapping posture, motion, gesture, pressure, and the like determined from sensor inputs to application control outputs.

The sensor interpreter 304 may use the sensor parameters 302 to define a set of rules for switching between different sensor modalities by reconfiguring the sensor interpreter. The rules may provide a framework for interpretation of the sensor criteria and reconfiguration of the sensor interpreter. As the sensor criteria changes, the rules may be used to configure the sensor interpreter for the new criteria. For example, the sensor interpreter 304 may reference transition rules for ranges at which the sensor interpreter should be reconfigured such that input operations are transitioned from one sensor to another based on effective range data received from the sensor parameters 302. For example, if a sensor parameter indicates a minimum effective range of 6 meters for a particular sensor, a rule may be established to disable that particular sensor when the user's location is closer than 6 meters from the sensor. Sensor criteria may indicate that the user is located at a distance of 5 meters from the particular sensor. Application of the rule would thus result in a reconfiguration of the sensor interpreter to disable the particular sensor. For example, if a particular sensor includes both a microphone and a gesture tracker, the sensor interpreter may be configured to disable the gesture tracker when the user travels outside the effective range of the gesture tracker, but the microphone may remain active as a sensor input since the microphone may be less dependent on a particular effective range.

The application 306 may be any application that is capable of receiving input from the sensor interpreter 304. The application 306 may execute on the same computing device as the sensor interpreter 304, or the application 306 may reside on another computing device, such as a network computer. In some embodiments, both the application 306 and the sensor interpreter 304 execute on a computing device such as the apparatus 102.

FIG. 4 is a flow diagram depicting an example method 400 for interpreting sensor input in accordance with an example embodiment of the present invention. The method 400 may operate to receive input from a plurality of input devices, derive sensor criteria from the plurality of input devices, configure a sensor interpreter according to the received input, and process the input using the configured sensor interpreter. In this manner, the method 400 may selectively interpret, process, and pass through certain inputs to control one or more applications in a way that provides a seamless, intuitive user experience.

At action 402, the method 400 receives sensor data from a plurality of sensors. For example, as described above, data may be received from multiple sensors coupled to a computing device. This data may describe one or more user inputs received from the sensors. The sensors may be associated with different types of data (e.g., posture data, motion data, gesture data, touch-screen data, voice data, eye gaze data), and various effective ranges.

At action 404, the method 400 may determine a set of sensor criteria for the plurality of sensors. As described above, the set of sensor criteria may be received from at least one of the sensors, the sensor criteria may be derived from sensor input from at least one of the sensors, or some combination of the two. The sensor criteria may describe the current state of the system by which the sensor interpreter should be configured. An example of sensor criteria may include a user's distance from one or more of the sensors, a particular location of the user relative to the one or more sensors, an ambient light level, a user status, background noise level (e.g., to decide whether to enable use of speech input commands), whether the user is wearing particular apparel or protective equipment (e.g., gloves that might affect the tracking ability of some sensors), or whether the user is holding a tracking marker. As a specific example, background noise might be used with a sensor to automatically detect noise levels and, above certain noise levels disable audio/speech as input. As another specific example, although tracking markers may be undesirable due to extra burden imposed on the user in managing the marker (e.g., having to wear a colored glove or the like), more precise results may be available, such that it may be worthwhile to enable the processing of such a marker in response to detection of the marker.

At action 406, the sensor criteria are used to configure the sensor interpreter. For example, the sensor interpreter may include a set of rules for enabling, disabling, weighting, modifying, or other managing input from the plurality of sensors based on the sensor criteria. For example, the sensor criteria determined at action 404 may indicate that the user's location is a particular distance from one or more of the sensors. The method 400 may thus configure the sensor interpreter to process input from the one or more sensors according to the rules defined for that particular user distance. As described above with respect to FIGS. 2 and 3, the sensor interpreter may include or reference a variety of rules for a variety of sensor criteria, such as, but not limited to, the user's distance from the sensors, which particular sensors are effective at a particular range, whether the user is moving toward or away from the sensor, the signal-to-noise ratio of each sensor at the particular range, the ambient light level, the status of the user, background noise level, whether the user is wearing particular apparel or protective equipment, whether the user is holding a tracking marker, or any other factor relevant to processing of the input data. These rules for configuring the sensor interpreter may be determined from a set of sensor parameters as described with respect to FIG. 3. For example, the sensor interpreter may be configured to enable or disable sensors based on the distance to the user's location based on the ranges at which sensors are effective, and the sensor effective range may be provided by the sensor parameters.

At action 408, the received sensor input is interpreted according to configuration of the sensor interpreter established at action 406. The configuration of the sensor interpreter may determine which of the sensors' input is passed on to an application. For example, the sensor interpreter may disable processing of close range (e.g., less than 10 centimeter) gesture input when a user is detected as several meters away from the interface, in order to avoid false positive inputs from the close range gesture sensor. Additionally or alternatively, input from a first gesture input sensor may be disabled when the user enters the effective range of a second, more precise gesture input sensor. In some embodiments, the sensor interpreter may be reconfigured according to the distance of the user to provide a consistent, seamless interface experience with increasing precision and accuracy as the user approaches the interface. At action 410, the interpreted sensor input is mapped to application commands passed to the application to be executed It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 114 of an apparatus employing an embodiment of the present invention and executed by a processor 112 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, from a first sensor of a plurality of sensors, first configuration data associated with the first sensor including a first indicator indicating a first effective range, wherein the first effective range is a first range of distance from the first sensor, and wherein the first configuration data defines how information from the first sensor is to be interpreted;
   receiving, from a second sensor of the plurality of sensors, second configuration data associated with the second sensor including a second indicator indicating a second effective range, wherein the second effective range is a second range of distance from the second sensor, the second range of distance is different from the first range of distance, and wherein the second configuration data defines how information from the second sensor is to be interpreted;
   receiving input from at least one of the plurality of sensors, wherein the at least one of the plurality of sensors is a gesture tracking device or a projected capacitive proximity sensor;
   receiving at least one sensor criteria from one or more of the first sensor and second sensor, wherein the at least one sensor criteria comprises a distance or a range of distances at which input to the respective sensor should be blended;
   determining, using a processor, a configuration of a sensor interpreter based on the received sensor criteria, the first configuration data of the first sensor, and the second configuration data of the second sensor;
   interpreting the received input based on the configuration of the sensor interpreter by blending input from the first sensor and the second sensor by at least:
      determining a distance between a user detected by the at least one of the first and second sensors and the other of the first or second sensor;
      enabling the first sensor in response to the distance being greater than a first threshold distance, the first threshold distance derived at least in part based on the first indicator;
      enabling the second sensor in response to the distance being less than a second threshold distance, the second threshold distance derived at least in part based on the second indicator; and
      enabling both the first sensor and the second sensor in response to the distance being greater than the second threshold distance and less than the first threshold distance; and
   processing the interpreted received input to instruct an application.

2. The method of claim 1, wherein interpreting the received input comprises disregarding input from at least one of the plurality of sensors.

3. The method of claim 1, wherein blending input comprises weighting the input based on the signal to noise ratio of the sensor from which the input was received.

4. The method of claim 1, wherein blending input comprises weighting the input based on the distance between a user detected by the sensor from which the input was received as compared to the effective range of the sensor from which the input was received.

5. The method of claim 1, further comprising:
   receiving a set of sensor parameters defining the capabilities of at least one of the plurality of sensors; and
   generating at least one rule for configuring the sensor interpreter based on the defined capabilities of the at least one of the plurality of sensors, wherein the at least one rule defines at least one configuration change of the sensor interpreter based on the received sensor criteria.

6. The method of claim 5, wherein the set of sensor parameters comprises at least one of a maximum effective range of the at least one of the plurality of sensors, a minimum range of the at least one of the plurality of sensors, and a signal to noise ratio at a particular distance of the at least one of the plurality of sensors.

7. The method of claim 1, wherein the sensor criteria further comprises at least one of the user's location, an ambient light level, an indicator of the user's status, a background noise level, apparel worn by the user, or the presence of a tracking marker.

8. The method of claim 1, wherein the sensor interpreter is configured based on the distance between the user and the sensor.

9. The method of claim 8, wherein a first sensor interpreter is associated with a first range of distances between the user and the sensor, and a second sensor interpreter is associated with a second range of distances between the user and the sensor.

10. The method of claim 9, wherein the first range of distances and the second range of distances overlap, providing hysteresis for a switch between the first sensor interpreter and the second sensor interpreter.

11. The method of claim 1, wherein the sensor criteria is derived from the received input.

12. The method of claim 1, further comprising:
determining which of the plurality of sensors is valid in response to a factor that indicates variability in the effectiveness of one or more of the plurality of sensors.

13. The method of claim 12, wherein the factor that indicates variability in the effectiveness of one or more of the plurality of sensors includes one or more of an environmental condition or a user status.

14. An apparatus comprising processing circuitry configured to:
receive, from a first sensor of a plurality of sensors, first configuration data associated with the first sensor including a first indicator indicating a first effective range, wherein the first effective range is a first range of distance from the first sensor, and wherein the first configuration data defines how information from the first sensor is to be interpreted;
receive, from a second sensor of the plurality of sensors, second configuration data associated with the second sensor including a second indicator indicating a second effective range, wherein the second effective range is a second range of distance from the second sensor, the second range of distance is different from the first range of distance, and wherein the second configuration data defines how information from the second sensor is to be interpreted;
receive input from the at least one of the plurality of sensors, wherein the at least one of the plurality of sensors is a gesture tracking device or a projected capacitive proximity sensor;
receive at least one sensor criteria from one or more of the first sensor and second sensor, wherein the at least one sensor criteria comprises a distance or a range of distances at which input to the respective sensor should be blended;
determine a configuration of a sensor interpreter based on the received sensor criteria, the first configuration data of the first sensor, and the second configuration data of the second sensor;
interpret the received input based on the configuration of the sensor interpreter by blending input from the first sensor and the second sensor by at least:
determining a distance between a user detected by the at least one of the first and second sensors and the other of the first or second sensor;
enabling the first sensor in response to the distance being greater than a first threshold distance, the first threshold distance derived at least in part based on the first indicator;
enabling the second sensor in response to the distance being less than a second threshold distance, the second threshold distance derived at least in part based on the second indicator; and
enabling both the first sensor and the second sensor in response to the distance being greater than the second threshold distance and less than the first threshold distance; and
process the interpreted received input to instruct an application.

15. The apparatus of claim 14, wherein interpreting the received input comprises disregarding input from at least one of the plurality of sensors.

16. The apparatus of claim 14, wherein blending input comprises weighting the input based on the signal to noise ratio of the sensor from which the input was received.

17. The apparatus of claim 14, wherein blending input comprises weighting the input based on the distance of the user compared to the effective range of the sensor from which the input was received.

18. The apparatus of claim 14, wherein the processing circuitry is further configured to:
receive a set of sensor parameters defining the capabilities of at least one of the plurality of sensors; and
generate at least one rule for configuring the sensor interpreter based on the defined capabilities of the at least one of the plurality of sensors, wherein the at least one rule defines at least one configuration change of the sensor interpreter based on the sensor criteria.

19. The apparatus of claim 18, wherein the set of sensor parameters comprises at least one of a maximum effective range of the at least one of the plurality of sensors, a minimum range of the at least one of the plurality of sensors, and a signal to noise ratio at a particular distance of the at least one of the plurality of sensors.

20. A computer program product comprising at least one non-transitory computer-readable storage medium bearing computer program instructions embodied therein for use with a computer, the computer program instructions comprising program instructions configured to:
receive, from a first sensor of a plurality of sensors, first configuration data associated with the first sensor including a first indicator indicating a first effective range, wherein the first effective range is a first range of distance from the first sensor, and wherein the first configuration data defines how information from the first sensor is to be interpreted;
receive, from a second sensor of the plurality of sensors, second configuration data associated with the second sensor including a second indicator indicating a second effective range, wherein the second effective range is a second range of distance from the second sensor, the second range of distance is different from the first range of distance, and wherein the second configuration data defines how information from the second sensor is to be interpreted;

receive input from at least one of the plurality of sensors, wherein at least one of the plurality of sensors is a gesture tracking device or a projected capacitive proximity sensor;

receive at least one sensor criteria from one or more of the first sensor and second sensor, wherein the at least one sensor criteria comprises a distance or a range of distances at which input to the respective sensor should be blended;

determine a configuration of a sensor interpreter based on the received sensor criteria, the first configuration data of the first sensor, and the second configuration data of the second sensor;

interpret the received input based on the configuration of the sensor interpreter by blending input from the first sensor and the second sensor by at least:

determining a distance between a user detected by the at least one of the first and second sensors and the other of the first or second sensor;

enabling the first sensor in response to the distance being greater than a first threshold distance, the first threshold distance derived at least in part based on the first indicator;

enabling the second sensor in response to the distance being less than a second threshold distance, the second threshold distance derived at least in part based on the second indicator; and enabling both the first sensor and the second sensor in response to the distance being greater than the second threshold distance and less than the first threshold distance; and process the interpreted received input to instruct an application.

* * * * *